Inventors
A. D. ODELL
H. F. HARTLEY
By Robert Harding Jr.
Attorney

July 5, 1960 A. D. ODELL ET AL 2,944,164

ELECTRICAL CIRCUITS USING TWO-ELECTRODE DEVICES

Filed May 13, 1954 7 Sheets-Sheet 2

Inventors
A. D. ODELL-
H. F. HARTLEY
By Robert Harding Jr.
Attorney

July 5, 1960 A. D. ODELL ET AL 2,944,164

ELECTRICAL CIRCUITS USING TWO-ELECTRODE DEVICES

Filed May 13, 1954 7 Sheets-Sheet 3

Inventors
A. D. ODELL
H. F. HARTLEY
By Robert Harding Jr.
Attorney

ELECTRICAL CIRCUITS USING TWO-ELECTRODE DEVICES

Filed May 13, 1954 7 Sheets-Sheet 4

Inventors
A. D. ODELL
H. F. HARTLEY
By Robert Harding Jr.
Attorney

ELECTRICAL CIRCUITS USING TWO-ELECTRODE DEVICES

Filed May 13, 1954 7 Sheets-Sheet 5

Inventors
A. D. ODELL
H. F. HARTLEY
By Robert Harding Jr.
Attorney

July 5, 1960 A. D. ODELL ET AL 2,944,164

ELECTRICAL CIRCUITS USING TWO-ELECTRODE DEVICES

Filed May 13, 1954 7 Sheets-Sheet 6

Inventors
A. D. ODELL
H. F. HARTLEY
By Robert Harding Jr.
Attorney

July 5, 1960 A. D. ODELL ET AL 2,944,164

ELECTRICAL CIRCUITS USING TWO-ELECTRODE DEVICES

Filed May 13, 1954 7 Sheets-Sheet 7

Inventors
A. D. ODELL
H. F. HARTLEY
By Robert Harding Jr.
Attorney

United States Patent Office 2,944,164

Patented July 5, 1960

2,944,164

ELECTRICAL CIRCUITS USING TWO-ELECTRODE DEVICES

Alexander Douglas Odell and Henry Frederick Hartley, London, England, assignors to International Standard Electric Corporation, New York, N.Y.

Filed May 13, 1954, Ser. No. 429,628

Claims priority, application Great Britain May 22, 1953

3 Claims. (Cl. 307—88.5)

The present invention relates to electrical circuits employing diodes.

It is well known that a crystal of germanium or silicon or other suitable semi-conductor, mounted on a metal bar or holder, and having a pointed wire or catswhisker in contact with its surface, often has a reverse resistance characteristic of which a portion has negative resistance. Such a crystal rectifier has been disclosed in the application of Kenneth Albert Matthews, Serial No. 302,065, filed August 1, 1952, now Patent No. 2,770,763, and comprises a semi-conducting body of given conductivity type having a layer of the opposite conductivity type on its surface. An electrode making a low resistance, non-rectifying, contact with part of the layer is provided. A thin film of the given conductivity type is provided over a limited area of another part of the said layer, and a second electrode is provided for making rectifying contact with this thin film. The two electrodes are spaced apart by a distance which lies between 0.001 and 0.01 of an inch. Such a rectifier which has the negative resistance in a portion of its reverse resistance characteristic is hereafter referred to as a "negative-gap diode."

It has also been discovered that rectifiers constructed in a particular manner have a negative resistance in one or more regions occurring in the forward or low resistance rectifier characteristic. Such a rectifier has been disclosed in the application of Alec Harley Reeves et al., Serial No. 314,061, filed October 10, 1952, and comprises an N-type semi-conducting material provided with a base electrode making a low resistance contact with part of the material. In making such a rectifier, an exposed surface of the material is etched, and a rectifying electrode of a material containing a donor impurity is provided in rectifying contact with a small area of the etched surface. A momentary electroforming current is then passed through the rectifying contact in the forward or low resistance direction, this current being of such a magnitude that the forward voltage-current characteristic of the rectifying contact has at least one negative resistance region. Such a rectifier having a negative resistance region in its forward or low resistance characteristic will be hereinafter referred to as a "positive-gap diode."

It is an object of the present invention to provide a number of electrical circuits using negative-gap diodes and positive gap diodes.

The main features of the present invention are set out in the accompanying statement of claim.

The invention will now be described with reference to the accompanying drawings, in which:

Fig. 1 is a current-voltage curve of a negative gap diode;

Fig. 1*a* is a current-voltage curve of a positive gap diode;

Figs. 2 and 2*a* are similar curves obtained when the respective diodes are connected in series with a resistor;

Figure 2:
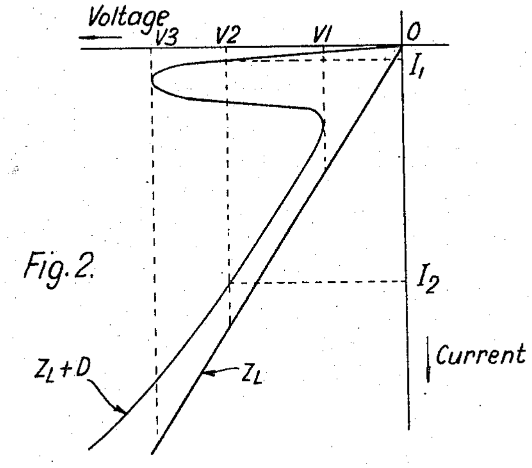

If the diode is connected in series with a fixed impedance whose characteristic is marked ZL in Fig. 2, the curve assumes the shape of the curve marked ZL+D, i.e. impedance plus diode. Hence for voltages across the diode less than V1, the current is single-valued and low and for voltages above V3 it is single-valued and high. For intermediate voltages such as V2, the current has three possible values, but that on the negative resistance portion is unstable. Hence the circuit has two stable states for such a voltage, a high current or "on" state and a low current or "off" state. These devices are referred as as "negative-gap diodes" because when the characteristic was plotted using a cathode ray tube, the beam was unable to follow the negative resistance portion, and so a gap appeared in the trace. Hence the term "negative-gap diodes" was adopted.

Figure 1:
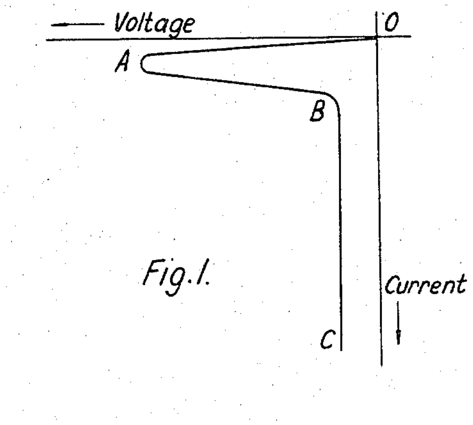
Fig. 1 shows the static characteristic of a negative-gap diode, and it can be seen that over the portion 0 to A the device shows a high positive resistance, from A to B a high negative resistance, and from B to C a low positive resistance.
Figure 1A:
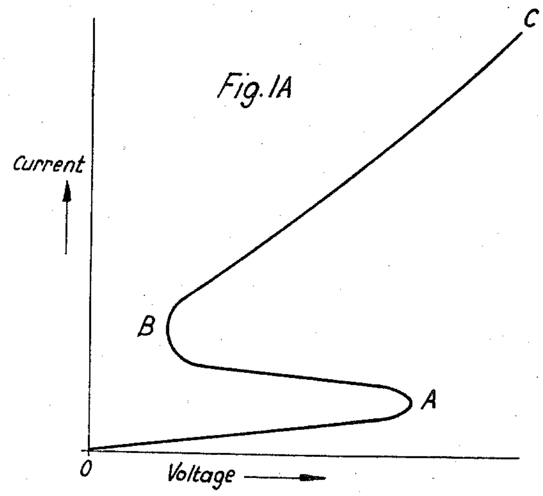

Fig. 1*a* shows the static characteristic of a positive-gap diode. This curve is opposite (in the first quadrant instead of the third quadrant) to the curve of Fig. 1, and it can be seen that over the portion 0 to A the device shows a high positive resistance, from A to B a high negative resistance, and from B to C a low positive resistance.

Figure 2A:
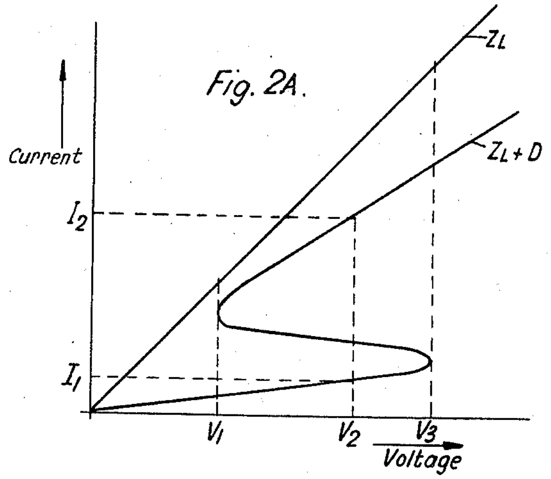

If the positive-gap diode is connected in series with a fixed impedance whose characteristic is marked ZL in Fig. 2*a*, the curve assumes the shape of the curve marked ZL+D, i.e. impedance plus diode. Hence for voltages across the diode less than V1, the current is single-valued and low and for voltages above V3 it is single-valued and high. For intermediate voltages such as V2, the current has three possible values, but that on the negative resistance portion is unstable. Hence the circuit has two stable states for such a voltage, a high current or "on" state and a low current or "off" state. These devices are referred to as "positive-gap diodes" because when the characteristic was plotted using a cathode ray tube in the manner explained for the negative-gap diode, the beam was unable to follow the negative resistance portion, and so a gap appeared in the trace. Hence the term "positive-gap diodes" was adopted.

The term gap diode will be used in the present specification when it is intended to mean either a positive or a negative gap diode. It must be remembered, however, that the voltage necessary to operate the two varieties of diodes are different, the positive gap diodes normally operating at lower voltage levels than the negative gap diodes.

Figure 3:
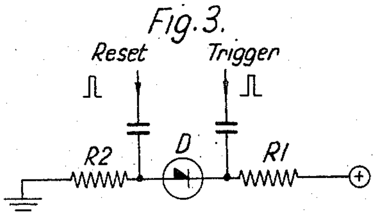
Fig. 3 is a known circuit using a negative gap diode.

Fig. 3 shows one method of transferring either a negative-gap or a positive-gap diode between its on and off states. The load is split into two portions R1 and R2. A positive pulse of suitable amplitude applied at the connection marked "Trigger" across R1 will transfer the gap diode D from its "off" state to its "on" state, while a similar positive pulse applied at the connection marked "Reset" across R2 will transfer the diode D from its "on" state to its "off" state.

The circuits to be described may be used with either the negative-gap diodes or positive-gap diodes. In these circuits and in the claims, the end of a gap diode which is connected to a positive potential when that diode is in its high resistance condition is designated the "anode" and the other end is designated the "cathode." In the circuits the diodes are drawn as ringed rectifiers.

Figure 4:
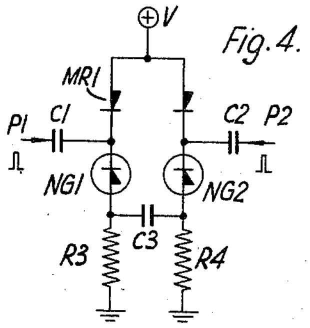
Fig. 4 shows a bistable circuit according to the present invention.

Referring now to Fig. 4, there are two gap diodes NG1 and NG2, each with a load resistor and a rectifier in series. The rectifiers serve to present a high impedance path to triggering pulses, i.e. they act as decouplers, and a low impedance path when the diode is in its "on" state.

Figure 5:
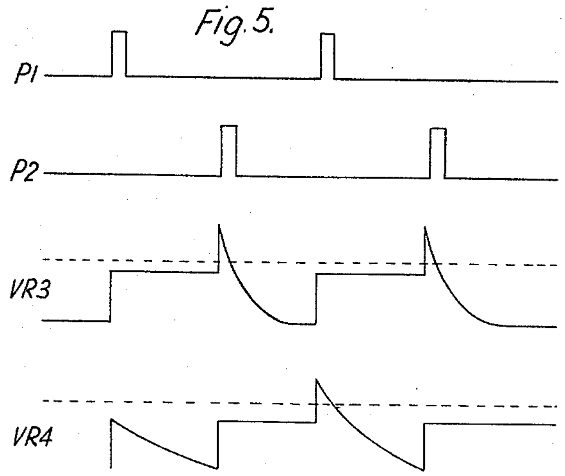
Fig. 5 shows waveforms encountered in the circuit of Fig. 4.

NG1 and NG2 are assumed to have similar characteristics, and the applied potential V is adjusted to be just below the turnover point, i.e., just to the right of V3 in Fig. 2 or to the left of V3 in Fig. 2*a*. When a positive pulse P1 of suitable amplitude and width is applied to NG1 via capacitor C1, the rectifier MR1 is biased to its high resistance condition and the potential across NG1 is raised to a value above its turnover point. Provided that the total circuit resistance is less than the incremental negative resistance of NG1 at this point, NG1 will pass rapidly via the unstable region of its characteristic to the high current or "on" state for voltage V. When this happens, NG1 passes a high current compared with that passed while it was in its "off" state, and so MR1 is no longer back-biassed. As shown in Fig. 5, a positive voltage step is generated across R3 and R4, that across R4 decaying exponentially according to the time constant $C3 \times R4$.

If a similar positive pulse P2 is now applied to the anode of NG2 via capacitor C2, diode NG2 will be set in the same manner to its "on" state. A voltage step is again produced across R3 and R4, and that across R3 raises the cathode voltage of NG1 sufficiently for NG1 to revert to its "off" state. On the next P1 pulse NG1 is switched on, and NG2 is switched off.

Figure 6:
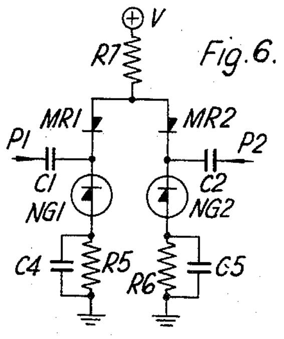
Fig. 6 is another bistable circuit according to the present invention.

In the alternative bistable circuit, shown in Fig. 6, the upper ends of the two decoupling rectifiers MR1 and MR2 are connected together and to a common anode load resistor R7. The cathode resistors R5 and R6 are shunted by capacitors C4 and C5 respectively. When a diode assumes its "on" state, a negative pulse is generated across R7 which switches the other diode off, since its cathode voltage is held up by the charged capacitor.

An obvious alternative to the circuit of Fig. 6 is to replace R7 with a separate resistor in each circuit, the upper ends of the metal rectifiers MR1 and MR2 being coupled by a capacitor.

The circuit of Fig. 6 has one disadvantage, in that in the "off" condition, a diode still passes current, producing an extra voltage drop across R7. Since this "off" current varies between samples, there will be variations in the operating point and a consequent reduction of operating limits. This disadvantage is overcome by the circuit of Fig. 8.

Figure 8:
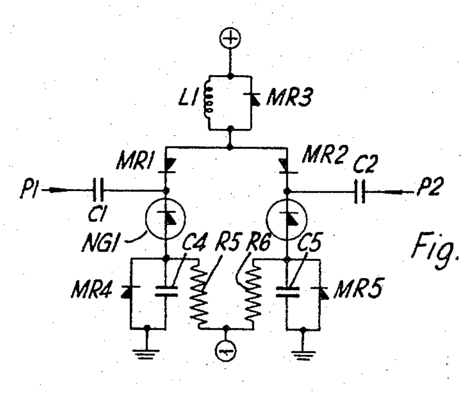
Fig. 8 shows a bistable circuit which is a refinement of the circuit of Fig. 6.

In the circuit of Fig. 8, R7 is replaced by an inductor L1 in parallel with a rectifier MR3. This inductor permits rapid changes in voltage from a defined operating point. It is desirable that when the flip-flop changes over, the transient developed across L1 is without overshoot. For this, assuming C4=C5 and R5=R6, the impedance of L1 should be greater than $4C_4R_6^2$. This can result in large values of inductance for L1, but the rectifier MR3 removes this limitation by limiting the positive overshoot when $Q>\frac{1}{2}$. This permits the use of smaller values of inductance for L1.

Also shown in Fig. 8 is a method for reducing the time necessary for the voltage across R5 or R6 to reach zero or a very low value when the corresponding diode is switched off. The resistors R5 and R6 are taken to a negative potential, and the cathodes of NG1 and NG2 are "caught" at earth by rectifiers MR4 and MR5 respectively. This permits the development of positive voltages across the cathode resistors but arrests the decay of the voltage at a defined point on the exponential.

Figure 9:
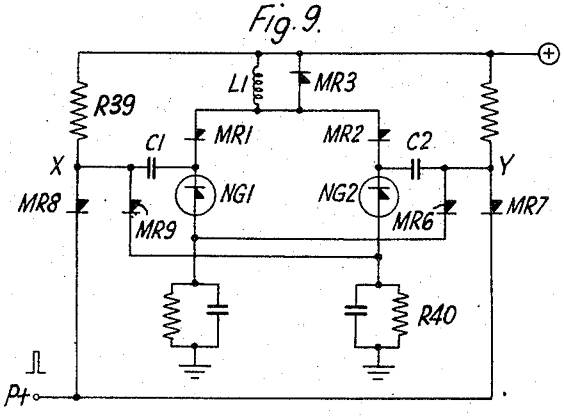
Fig. 9 shows a binary pair derived from the circuit of Fig. 8.

Fig. 9 shows a cross-gated binary pair derived from Fig. 8. It will be assumed that NG1 is in its "on" state and NG2 is off. Therefore the voltage drop across the cathode resistor of NG1 biasses rectifier MR6 positively. In the absence of a pulse on the input lead, MR7 is not biased positively, the potential of the pulse input lead being at or near earth potential.

When a pulse occurs on the common pulse input, MR7 and MR8 are both biassed positively. As NG2 is off, MR9 is substantially unbiassed, so that the potential of X remains at or near earth potential because of current flowing through R39, MR9 and R40 in series. By suitable choice of values for R39 and R40 the potential at X is near earth when NG2 is off. However, the potential of Y rises because both MR6 and MR7 are biassed positively. Hence NG2 is triggered on, and this cuts NG1 off. The next pulse restores the circuit to its original condition.

There is a limitation on this circuit in that the input pulses must not be long enough to allow the cathode capacitor of the newly switched-on diode to charge sufficiently to switch the other diode on. This circuit has given good results using 1 microsecond pulses at 60 kcs. It is necessary to provide means for operating one diode when switching on, but such means are well known. For example, this can be done by methods similar to those used in conventional gas tube counters, for intsance by an independent connection to one of the diodes, which connection is decoupled from the other diode. A positive pulse applied to this connection will then produce the desired reset operation.

Figure 10:
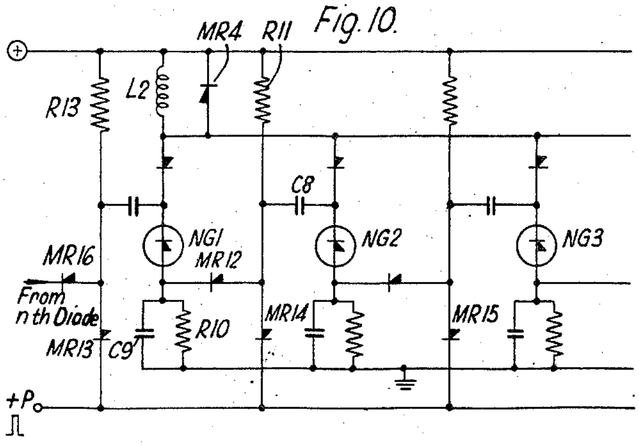
Fig. 10 shows a Scale-of-N counter.

Fig. 10 shows a scale-of-N counter using gap diodes, the counter having a coincidence gate between consecutive diodes. Three diodes NG1 to NG3 are shown, although the chain may consist of any number of diodes. All diodes share a common anode load impeder formed by an inductor L2 in parallel with a rectifier MR4. These correspond to L1 and MR3 of Figs. 8 and 9. In fact, the circuit of Fig. 10 can be regarded as fundamentally the same as that of Fig. 9. Further all the bistable circuits shown are really scale-of-N counters, wherein N=2.

To turn to Fig. 10, it will be assumed that NG1 is in its "on" state, and all other diodes are off. The current flowing in the circuit produces a voltage drop across the cathode resistor R10 of NG1, and therefore metal rectifier MR12 is biassed positively. In the absence of an input pulse the pulse lead P is at or near earth potential, so only NG1 is on. When a positive pulse occurs on the common lead, it biasses positively rectifiers MR13, MR14, MR15 and corresponding rectifiers associated with other diodes. Hence both MR12 and MR14 are biassed positively, so the coincidence gate formed by these two rectifiers and the connection to positive via resistor R11 delivers a positive pulse via C8 to the anode of NG2. It will be seen that since only NG1 was on, only one gate has all its controlling rectifiers biassed positively.

The pulse applied to NG2 via the coincidence gate causes it to assume its "on" state, and so an increased current flows in L2 and MR4, producing a voltage drop thereacross. The cathode voltage of NG1 is held positive, since the capacitor C9 is charged, and the result of the increased voltage drop in the anode load is to reduce the anode-cathode voltage of NG1 enough for NG1 to return to its "off" state. The next pulse will bring NG3 on and cut NG2 off, and so on.

As shown, the gate R12, MR13, MR16 interconnects the Nth tube, NG1 and the pulse supply. If the counter is not intended to be used as a closed ring counter, this gate is omitted and a reset connection is provided to initially set the counter with NG1 in its "on" state.

Figure 11:
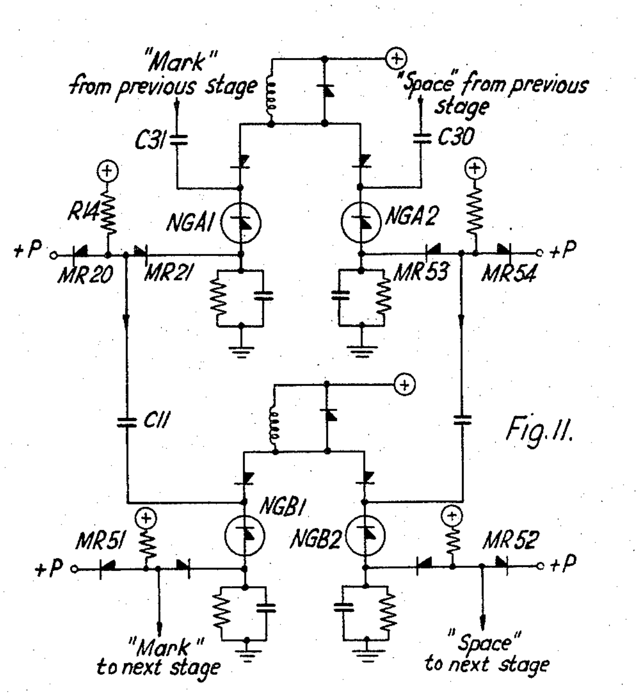
Fig. 11 shows a pattern movement register or shift register.

The circuit of Fig. 11 comprises two stages of a pattern movement register, each stage being a bistable circuit, such as is shown in Fig. 8, but without the modified cathode circuit used in that circuit. Each diode is controlled by a gate circuit which is itself controlled from the corresponding diode of the preceding stage and from the common pulse supply. To simplify the circuits, the connections from the common pulse supply are shown as separate leads to the gate circuits just mentioned. To indicate that these leads all receive pulses from the common supply they are all marked +P. Thus NGA1 is controlled by the gate formed by metal rectifiers MR20 and MR21 and resistor R14. When diode NGA1 is in its "on" state, MR21 is biassed positively, and as the next P pulse is applied to MR20 the latter is also biassed positively, so that a positive pulse is then appled, via capacitor C11, to the anode of diode NGB1, which therefore assumes its "on" state, if not already on. NGB2 is similarly controlled. Gates for NGA1–NGA2 controlled by the previous stage, if any, would be provided, and gates are shown for the stage after NGB1–2 controlled by NGB1–NGB2.

In each stage of the circuit, "Mark" is indicated by the 1 diode being on and the 2 diode being off, and "space" by the 2 diode being on and the 1 diode being off. Hence the 1 diodes, of which NGA1 and NGB1 are shown, can be designated the Mark diodes and the 2 diodes, of which NGA2 and NGB2 are shown can be designated the Space diodes.

For a brief description of the operation it will be assumed that the stage preceding NGA1–NGA2 has its 2 diode on and its 1 diode off, i.e. that it stores Space, that NGA1 is on and NGA2 off, for Mark and that NGB1 is on and NGB2 off for Mark. As already described, each positive input pulse, or step pulse P, is applied to a gate of each diode. These pulses, as shown, are applied to rectifiers MR20, MR50, MR51 and MR2 associated with the gap diodes NGA1, NGA2, NGB1 and NGB2 respectively, and to corresponding rectifiers associated with the diodes of other stages not shown.

Figure 7:
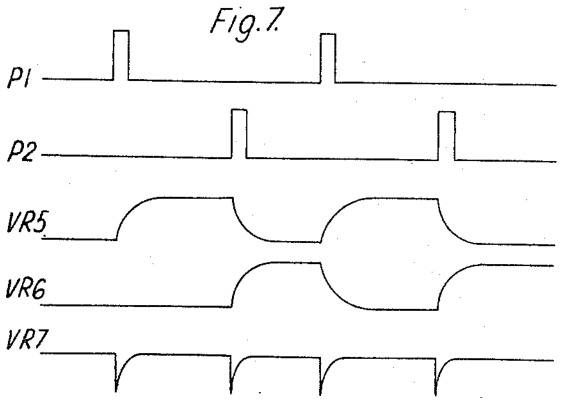
Fig. 7 shows waveforms encountered in the circuit of Fig. 6.

When the first P pulse occurs, with the conditions set out above, the gate associated with the 2 diode of the stage before NGA1–2 delivers an output which is applied to the anode of NGA2 via capacitor C30. This switches NGA2 on and NGA1 off. Since the P is also applied to MR20, and MR21 is biassed positively as a result of the cathode potential of NGA1, the gate of NGA1 delivers an output which reaches the anode of NGB1 via C11. Since this stage already has its 1 diode on, this has no effect. The gate consisting of MR50, MR53 and R41 is unable to deliver an ouput for the P pulse whose results are being discussed since the voltage at the cathode of NGA2 does not reach a value which is effective on this gate until the P pulse ends. The curves of Fig. 7 for the circuit of Fig. 6 illustrate this phenomenon.

Considering the effect of this P pulse on the NGB stage, it will be seen that only the gate controlled by the cathode of NGB1, i.e. that including MR51, can deliver an output, and this output is applied to the 1 diode of the next stage over the lead labelled "Mark to next stage."

Thus it will be seen that in response to each P pulse, each pair of diodes is either set to or left in the condition in which the pulse found the preceding pair. The pattern of stored intelligence is thus progressed along the register one stage in response to each received P pulse.

Intelligence can be inserted between stepping pulses either serially, i.e. at one stage, or parallel-wise, i.e. at a number of stages equal to the number of intelligence elements.

In the first case, i.e. where intelligence is inserted serially, it will be assumed for the purposes of explanation that NGA1–NGA2 forms the first pair of diodes in the chain. Then each element of the intelligence being inserted is applied to either C30 or C31 depending on whether it is space or mark. Thus if the element is space, it would be applied via C30 to switch NGA2 on, and if a mark, via C31 to switch NGA1 on. In either case, just after the stage has been set in response to the element, a step pulse occurs and moves this element to NGB1–2. This would, of course, not alter the condition of NGA. Then the second element sets NGA, either leaving it as it was, if the same element, or reversing it, if the other element. The next P pulse then moves this stored pattern on, as already described.

In the second case, i.e. where intelligence is inserted parallel-wise, the leads such as those including C31, C30, C11 etc., each include a rectifier between the capacitor and the diode anode. The additional input circuits, of which one is provided per diode are then connected also to the junction between the positive gap diode and the rectifier in its anode circuit. These leads each include rectifiers. Each of these rectifiers therefore acts as a decoupling rectifier, so that each positive gap diode has two electrically independent controlling inputs.

Thus it will be seen that in response to each P pulse, each pair of diodes is either set to or left in the condition in which the pulse found the preceding pair. The pattern of stored intelligence is thus progressed along the register one stage in response to each received P pulse. Intelligence can be inserted between stepping pulses either serially, i.e. at one stage, or parallel-wise, i.e. at a number of stages equal to the number of intelligence elements. In either cases additional input circuits are provided to the appropriate diodes, which circuits will be rectifier-decoupled.

Figure 12:
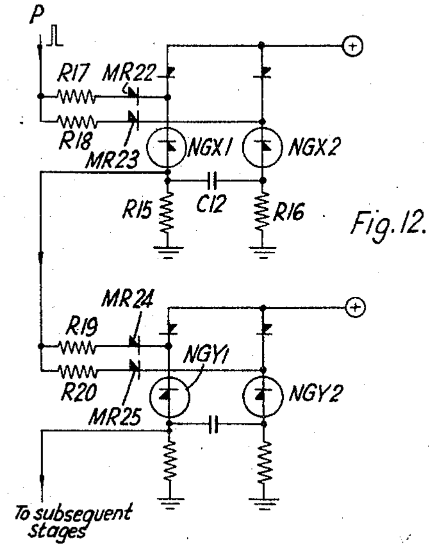
Fig. 12 is a binary counter.

Fig. 12 shows a binary counter which has a bistable circuit, such as shown in Fig. 4, per stage. Considering the first pair NGX1–NGX2, advantage is taken of the fact that the cathode time constants R15–C12 and R16–C12 can be made great enough to enable the diodes to be pulsed in parallel. Thus the circuit divides by two. Further, on alternate pulses, the voltage across R15 is approximately twice the supply voltage. It will be remembered that in all of the circuits described above, the supply voltage is slightly below the turnover voltage necessary to switch a diode from "off" to "on." Hence, when the voltage across R15 reaches its peak value, a positive pulse greater in potential than the turnover value is applied to the second stage NGY1–NGY2.

It will be assumed that NGX2 and NGY2 are on, and NGX1 and NGY1 are off. A positive pulse on the input is applied via the resistors R17, R18 and rectifiers MR22, MR23 to the anodes of NGX1 and NGX2. Since NGX1 is off, there is little or no voltage across its cathode resistor R15, and since NGX2 is on, there is a voltage across its cathode resistor R16 which is almost equal to the supply voltage. When the first pulse occurs, it switches NGX1 on, as already described, and current flow in R15 produces a voltage drop thereacross. This applies a pulse via C12 to R16, which reduces the anode-cathode voltage of NGX2 sufficient to bring it below turnover, thus switching NGX2 off. The positive potential on R15 is applied via R19, R20 and MR24, MR25 to the anodes of NGY1 and NGY2. However, this voltage is below supply voltage by the voltage drop across NGX1 and its anode rectifier and so has no effect on NGY2.

The second pulse finds NGX1 on and NGX2 off, and therefore switches NGX2 on. A positive potential is thereby developed across R16, and a positive pulse applied via C12 to the cathode of NGX1. This switches NGX1 off. However, for a very short period a voltage almost equal to twice the supply voltage is present across R15. This peak voltage is applied to NGY1 and NGY2 via R19, MR24 and R20, MR25, where it changes this stage to NGY1 on and NGY2 off. Further pulses will cause similar operation, each stage dividing by two.

It will be noted that in the pattern movement register of Fig. 11 and the binary counter of Fig. 12 different forms of bistable circuit have been used. Clearly any one of the bistable circuits already described can be used in such circuits.

Figure 13:
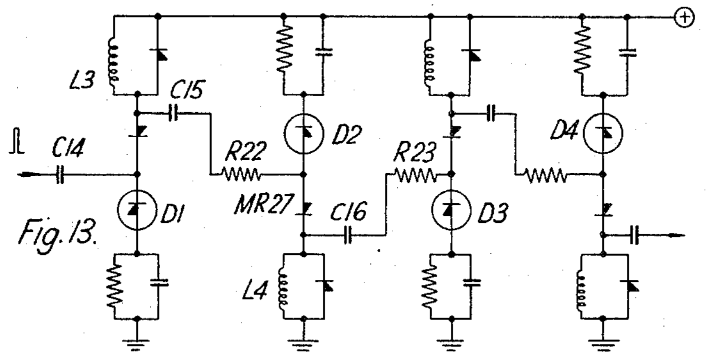
Fig. 13 is a binary counter using one diode per counter stage.

The next circuit, Fig. 13, shows a binary counter having a single gap diode per stage. In view of the extensive circuit descriptions which have already been given, the simplest method of describing Fig. 13 will be to describe its response to a pulse train. For this purpose it will be assumed that all diodes are in their off state initially.

The first positive pulse is applied via capacitor C14 to the anode of D1 which thereupon assumes its "on" state. The current flow, so produced, causes a large voltage drop across L3, with the result that a large negative pulse is applied via C15 and R22 to the cathode of D2. This pulse blocks rectifier MR27 and causes D2 to assume its "on" state. The current flow therethrough causes a large positive potential to be developed across the inductor L4, with the result that a positive pulse is applied via C16 and R23 to the anode of D3. D3 therefore assumes its "on" state, followed by D4 in the same manner as D2 followed D1. Hence the first pulse sets all diodes to their "on" states.

The second received pulse finds D1 on, and so the rise in voltage on its leading edge has no effect. However, on the trailing edge of the pulse the fall in voltage switches D1 off. Hence the second pulse has switched D1 off.

The third pulse switches D1 on, and the negative-going anode pulse therefrom is applied via C15 and R22 to D2. Here the rise in voltage which occurs on the trailing edge of the pulse switches D2 off.

The fourth pulse switches D1 off in the same manner as did the second pulse.

On the fifth pulse, D1 is switched on and this applies a negative pulse via C15–R22 to D2 which is therefore switched on. The positive cathode pulse so produced switches D3 off on its trailing edge.

The action of the circuit in response to succeeding impulses does not need to be described as it is similar to what has already been described.

When the circuit is in use, the condition in which all diodes are in their "on" state is used as a normal or rest condition. Then when one stage of the counter stores the binary digit 1, its diode is in the "off" state, and when it stores 0 its diode is in its "on" state. Hence the train of five pulses whose effect on the circuit has been described would be a "reset" pulse to set the circuit to zero, followed by a train of four pulses to be stored in binary notation.

Figure 14:
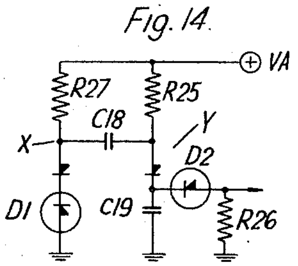
Fig. 14 is an astable multivibrator.

Fig. 14 shows a circuit of a simple astable circuit, the term "astable circuit" meaning a circuit having no stable state, i.e. the type of circuit which is also known as a free-running multi-vibrator. The two gap diodes D1 and D2 are operated from a supply voltage which is greater than the "turnover" voltage of the diode. When the circuit is switched on, one of the diodes assumes its "on" state first as a result of slight differences between the turnover voltages of individual diodes.

Assume that D1 assumes its "on" state first. The voltages at points X and Y will therefore fall to a value very near to earth potential. Since D1 is in its high current or "on" state, the voltage at X remains substantially constant, while that at Y increases exponentially. This is because the inter-anode coupling capacitor C18 charges through the resistor R25 towards the supply voltage. In due course the voltage at Y reaches the turnover voltage, and D2 is switched to its "on" state. The capacitor C19 thereupon discharges through D2 and resistor R26 in series. The pulse across R26 is an output pulse from the circuit. The capacitor C19 is provided, so that when D2 is switched on the rise in potential at the upper end of R26 due to D2 passing a relatively high current is augmented by that due to the discharge circuit of C19, thus giving an enlarged output pulse.

Returning to the action of the circuit, as C19 discharges, the voltage at Y falls, so that a fall in voltage is applied via C18 to the anode of D1. D1 therefore reverts to its "off" state. The voltage at Y is therefore now held steady at a low value by current flow in R25, D2 and R26, while the voltage at X rises exponentially as C18 charges via R27. In due course D1 comes on, and switches D2 to its "off" state. The frequency can be varied by varying C18 over a wide range, and R25, R27 and the supply voltage over a more limited range.

Figure 15:
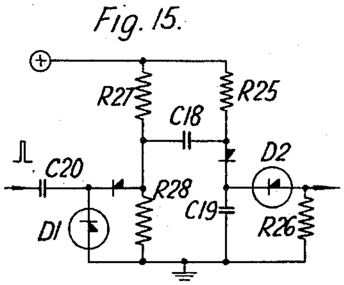
Fig. 15 is a monostable flip-flop.

By suitably adjusting the supply potential to one diode, the circuit can be made monostable. A convenient way of doing this is shown in Fig. 15, wherein the same references are used as in Fig. 14 where this is possible. The first diode D1 is connected via its associated metal rectifier to a point on a bleeder circuit formed by R27 and an additional resistor R28. The normal state is with D2 on and D1 off.

When a positive input pulse is applied via capacitor C20 to the anode of D1, D1 operates to its "on" state and via C18, extinguishes D2. After the charging period of C18 and C19, D2 is reoperated to its "on" state in the same manner as in Fig. 14. An output pulse is then obtained across R26. The circuit can thus be used as a delay circuit, the duration of the delay being variable by adjustment of C18, R25 and the supply voltage.

Both the circuits of Figs. 14 and 15 can be used to give output pulses of the order of 0.5 microsecond or more at an amplitude of 25 volts across a 100 ohm resistor for R26.

Figure 16:
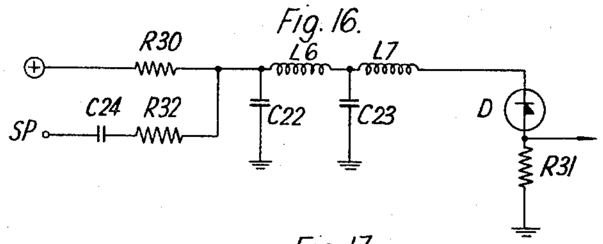
Fig. 16 is a pulse generator.

Fig. 16 is a pulse generator using a gap diode D and an open circuited delay line formed by capacitors C22, C23 and inductors L6 and L7. The supply resistor R30 is preferably of a relatively high value, so that its effect on the line constants is negligible. When the circuit is switched on, the capacitors C22 and C23 charge through R30, so that the potential across the diode D depends on the charging circuit for these capacitors. While this charging is in progress the diode D and its load resistor R31 pass a very low current, that which is normally passed by D in its low current state.

In due course the capacitors C22–C23 will become charged to a value such that the diode anode voltage is sufficient to switch the diode on, when the voltage across R31 increases rapidly. This high current state persists for a period determined by the constants of the line, whereafter the anode voltage falls until a point is reached at which D is switched off.

The action so far can be explained on normal delay line theory. The switching on applies a pulse which travels down the line, and is then reflected back along the line. When this pulse reaches the right-hand end of the line it switches D on, and is also reflected back along the line. As a result of this reflection, the voltage on D falls, and when it falls it switches D off. Thus we have generated a pulse. As soon as D is switched off, the line, which has been discharged by the reflection, commences to re-charge, and thus the cycle is recommenced. The input connection SP may be used to apply a synchronising input to the circuit via a decoupling capacitor C24 and resistor R32.

Figure 17:
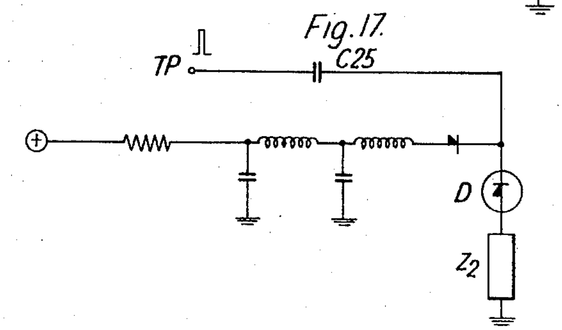
Fig. 17 is a pulse regenerator.

In the circuit of Fig. 17, the positive supply potential is such that it cannot alone operate D. To operate the gap diode an extra voltage is necessary, and this extra voltage is supplied by a positive trigger pulse applied to the diode via capacitor C25. Apart from this, the action of the circuit is the same as that of Fig. 16.

Figure 18:
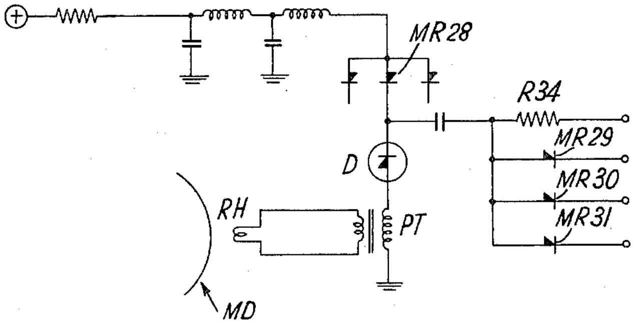
Figs. 18 and 19 show circuits wherein pulse regenerators are used to control recording on a magnetic drum.

Fig. 18 shows a circuit in which a gap diode is used to feed information for storage on a magnetic drum MD to the recording head RH associated with the drum. In this case there are a number of diodes, such as D, each connected to a delay line via a decoupling rectifier, such as MR28. Hence one delay line is common to a number of diodes, each diode of which might apply to a different recording head. The diode shown is under the control of a coincidence gate R34—MR29—MR30—MR31. The output circuit of the diode D includes a pulse transformer PT. In such a circuit the matching between the diode and the recording head is not very critical.

Figure 19:
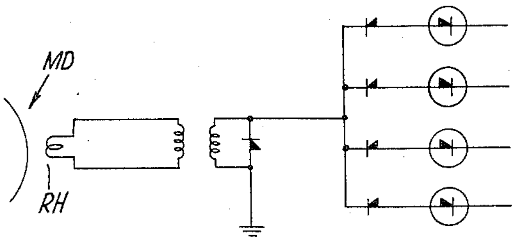

Fig. 19 shows several gap diodes connected to the same pulse transformer via decoupling rectifiers.

These recording control circuits are clearly applicable to other forms of memory device such as ferroelectric and ferromagnetic storage systems.

While the principles of the invention have been described above in connection with specific embodiments, and particular modifications thereof, it is to be clearly understood that this description is made only by way of example and not as a limitation on the scope of the invention.

What is claimed is:

1. An electrical circuit which comprises two gap diodes, each of which has two stable states, one being a high current or "on" state and the other being a low current or "off" state, interconnections between said diodes including means responsive to either one of said diodes assuming its "on" state when the other one of said diodes is in its "on" state for causing said other diode automatically to assume its "off" state, means for supplying pulses to each said diode of such polarity that a pulse applied to a diode in its "off" state causes that diode to assume its "on" state, a source of voltage supply, a rectifier connected between the anode of each said diode and the positive side of said voltage source, each said rectifier being so poled as to be in the direction of easy conductivity for current flowing away from said source, a pulse input connection to the anode of each said diode, and a resistor between the cathode of each said diode and the negative side of said source, said interconnections comprising a capacitor connected between the cathodes of said diodes.

2. A circuit, as claimed in claim 1, in which the gap diodes are negative-gap diodes.

3. A circuit, as claimed in claim 1, in which the gap diodes are positive-gap diodes.

References Cited in the file of this patent

UNITED STATES PATENTS

| | | |
|---|---|---|
| 2,310,328 | Swift | Feb. 9, 1943 |
| 2,510,167 | Boothroyd | June 6, 1950 |
| 2,569,345 | Shea | Sept. 25, 1951 |
| 2,581,273 | Miller | Jan. 1, 1952 |
| 2,594,336 | Mohr | Apr. 29, 1952 |
| 2,614,141 | Edson et al. | Oct. 14, 1952 |
| 2,636,133 | Hussey | Apr. 21, 1953 |
| 2,641,717 | Toth | June 9, 1953 |
| 2,644,895 | Lo | July 7, 1953 |
| 2,655,609 | Shockley | Oct. 13, 1953 |
| 2,757,286 | Wanlan | July 31, 1956 |
| 2,773,982 | Trousdale | Dec. 11, 1956 |

FOREIGN PATENTS

| | | |
|---|---|---|
| 159,041 | Australia | Sept. 27, 1954 |
| 166,800 | Australia | Feb. 6, 1956 |